United States Patent
Libin et al.

(10) Patent No.: US 9,800,995 B2
(45) Date of Patent: Oct. 24, 2017

(54) DISTRIBUTED APPLICATION FUNCTIONALITY AND USER INTERFACE FOR MULTIPLE CONNECTED MOBILE DEVICES

(71) Applicant: Evernote Corporation, Redwood City, CA (US)

(72) Inventors: Phil Libin, San Jose, CA (US); Andrew Sinkov, San Francisco, CA (US)

(73) Assignee: EVERNOTE CORPORATION, Redwood City, CA (US)

(*) Notice: Subject to any disclaimer, the term of this patent is extended or adjusted under 35 U.S.C. 154(b) by 0 days.

(21) Appl. No.: 14/547,337

(22) Filed: Nov. 19, 2014

(65) Prior Publication Data
US 2015/0141076 A1    May 21, 2015

Related U.S. Application Data

(60) Provisional application No. 61/906,571, filed on Nov. 20, 2013.

(51) Int. Cl.
*H04W 88/02* (2009.01)
*H04W 4/00* (2009.01)
*H04M 1/725* (2006.01)

(52) U.S. Cl.
CPC .......... *H04W 4/003* (2013.01); *H04M 1/7253* (2013.01)

(58) Field of Classification Search
CPC .... H04W 4/003; H04W 88/02; H04M 1/7253
USPC .......... 455/557, 41, 41.2; 707/722; 715/738; 340/539.11, 539.1; 726/19, 5, 6
See application file for complete search history.

(56) References Cited

U.S. PATENT DOCUMENTS

| | | | |
|---|---|---|---|
| 2005/0093868 A1 | 5/2005 | Hinckley | |
| 2007/0050618 A1 | 3/2007 | Roux et al. | |
| 2008/0216171 A1* | 9/2008 | Sano | H04L 9/32 726/19 |
| 2010/0201482 A1 | 8/2010 | Robertson et al. | |
| 2012/0167195 A1 | 6/2012 | McQuaide | |
| 2013/0106603 A1* | 5/2013 | Weast | G06F 1/163 340/539.11 |
| 2013/0268292 A1* | 10/2013 | Kim | G06F 19/3418 705/2 |

(Continued)

*Primary Examiner* — Kamran Afshar
*Assistant Examiner* — Farid Seyedvosoghi
(74) *Attorney, Agent, or Firm* — Morgan, Lewis & Bockius LLP (57) ABSTRACT

Providing a distributed application on a plurality of personal devices of a user includes providing a first portion of the distributed application on a first personal device and providing a second portion of the application on a second personal device different from the first personal device, where the second personal device is wearable by the user and where the second portion of the distributed application operates on data that is inaccessible to the first personal device to provide a result thereof to the first portion of the distributed application. The first personal device may be a mobile phone, a tablet, or a personal computer. The second personal device may be a smart glasses, a wearable camera, a smart watch, a wristband, smart earwear, gloves, a necktie, a smart carrying bag, a smart backpack, a smart clothing or smart shoes. The second personal device may be a wearable activity tracking monitor.

27 Claims, 7 Drawing Sheets

(56) References Cited

U.S. PATENT DOCUMENTS

2014/0173447 A1* 6/2014 Das .................... G06F 3/04842
715/738
2015/0278374 A1* 10/2015 Van De Poel ............ G06F 8/61
707/722

* cited by examiner

DISTRIBUTED APPLICATION FUNCTIONALITY AND USER INTERFACE FOR MULTIPLE CONNECTED MOBILE DEVICES

CROSS-REFERENCE TO RELATED APPLICATIONS

This application claims priority to U.S. Prov. App. No. 61/906,571, filed Nov. 20, 2013, and entitled "APPLICATIONS WITH DISTRIBUTED USER INTERFACE FOR MULTIPLE CONNECTED MOBILE DEVICES", which is incorporated by reference herein.

TECHNICAL FIELD

This application is directed to the field of information management and presentation, especially in conjunction with design, functionality and user interface of distributed multi-platform mobile applications.

BACKGROUND OF THE INVENTION

Modern lifestyle is undergoing one of the most fundamental changes in decades, thanks to quick emergence of a mobile computing paradigm. The first phase of this trend brought the proliferation of smartphones and tablets. According to market statistics and forecasts, smartphones and tablets have outsold personal computers for the first time in the fourth quarter of 2011. Three years later, in the fourth quarter of 2014, the unit shipment volume of tablets alone is expected to exceed cumulative personal and business PC shipments, and by 2017, about 87% of the market share of smart connected devices will belong to smartphones and tablets, compared with 13% for desktop and mobile PCs. In response to growing volumes and expanding features sets of smartphones and tablets, a new generation of mobile software applications has emerged that utilize enhanced smartphone connectivity, take advantage of their content capturing capabilities via embedded cameras, microphones, handwritten input, make use of device motion sensors, multi-touch screens, etc.

Another trend in mobile application development is the result of the multi-platform co-existence of PCs, smartphones and tablets. With four major PC and mobile platforms—Windows, Mac, iOS and Android—running on billions of end user devices with vastly different hardware and software characteristics and form factors, developers are increasingly improving multi-platform applications. Since many current users own both PCs and smartphones, quick proliferation of multi-platform content management applications, such as the Evernote service and software developed by Evernote Corporation of Redwood City, Calif., is suggesting a strong usage case for cloud-based personal information management applications. This trend also underscores the demand for multi-platform user interfaces. Massive market experiments indicate that users strongly prefer multi-platform user interfaces that deliver the best experience on each particular platform rather than a scrupulous feature and UI parity across different platforms. Thus, Evernote client software follows user interface styles and guidelines adopted on each platform; even devices with different form factors on the same platform, such as iPhone and iPad, may employ different Evernote user interface designs and layouts. Still, some essential similarities of UI metaphors on high resolution screens with touch interfaces and ways of interaction with application elements and outlines on various platforms induce similarities in multi-device application usage and UI.

However, even the aforementioned reduced similarity in usage patterns for multi-platform application may disappear in the near future. The next wave of mobile computing is broadly associated with multi-purpose and specialized mobile devices, especially wearable computers, such as smart bands, smart watches, smart glasses and other head-mounted cameras and displays, intelligent and adaptable clothes, wearable medical devices, etc. In 2014, wearables shipments are expected to exceed 20M units, a 129% growth from 2013, dominated by smart watches and smart bands (wrist band, arm band, head band activity trackers). According to market forecasts, about 250 million wearable devices will be in use by 2018, with annual shipments reaching 135 million units and the cumulative volume of sales of wearable devices in 2014-2018 exceeding 370 million units. Wrist-worn devices, such as smart watches and wristbands for activity tracking and medical purpose, are expected to retain their domination of the early wearables market. Some analysts project the market share of wrist-worn wearables to reach 87% of all wearable shipments in 2018.

As a result of the ever expanding mobile market, software applications may adapt by running in parallel on multiple devices of the same owner, with vastly different control, display, data capture and connectivity features, form factors and other parameters. In fact, the role of application replicas on various devices may depend on specialized capabilities of the devices running the applications, such as a broad spectrum of connectivity and input options on smartphones, instant hands free access to data on smart watches and smart glasses, seamless biometric user authentication capabilities of body sensors such as wristbands, etc.

In addition to the above differences between application features and usage on diverse mobile devices, the devices may interact with other software and mobile networks, such as a car or enterprise or home control systems running on an even broader set of devices. Accordingly, personal mobile devices may have different means of interacting with extended mobile networks, which leaves an even smaller space for common, unified user interfaces.

Accordingly, it is desirable to design new distributed feature sets and user interfaces for software applications simultaneously running on multiple interconnected mobile devices located on or with a user.

SUMMARY OF THE INVENTION

According to the system described herein, providing a distributed application on a plurality of personal devices of a user includes providing a first portion of the distributed application on a first personal device and providing a second portion of the application on a second personal device different from the first personal device, where the second personal device is wearable by the user and where the second portion of the distributed application operates on data that is inaccessible to the first personal device to provide a result thereof to the first portion of the distributed application. The first personal device may be a mobile phone, a tablet, or a personal computer. The second personal device may be a smart glasses, a wearable camera, a smart watch, a wristband, smart earwear, gloves, a necktie, a smart carrying bag, a smart backpack, a smart clothing or smart shoes. The second personal device may be a wearable activity tracking monitor. At least some data used by the first personal device may be provided via the Internet. At least one of the personal devices may use GPS functionality. The first personal device may communicate with the second personal device using a wireless network. The second personal device may be used to authenticate the user to allow operation by the first personal device. The second personal device may authenticate the user with biometrics. An event at a particular one of the personal devices may cause the particular one of the personal devices to activate another one of the personal devices. Activation of the other one of the personal devices may require additional input by the user. Data collected on the second personal device may be visually presented to the user on the first personal device. Each of the first and second portions of the distributed application may be defined according to an application identifier, a specific one of the personal devices on which each of the portions runs, an event that causes each of the portions to run, at least one other of the personal devices that interacts with the specific one of the personal devices, and a task initiated on the at least one other of the personal devices. One of the personal devices may activate at least one other device that is separate from the user. The at least one other device may be a garage door opener, a house door opener, and/or a climate control device.

According further to the system described herein, a non-transitory computer-readable medium contains a distributed application with software runnable on a plurality of personal devices of a user. The software includes executable code corresponding to a first portion of the distributed application that runs on a first personal device and executable code corresponding to a second portion of the application that runs on a second personal device different from the first personal device, where the second personal device is wearable by the user and where the second portion of the distributed application operates on data that is inaccessible to the first personal device to provide a result thereof to the first portion of the distributed application. The first personal device may be a mobile phone, a tablet, or a personal computer. The second personal device may be a smart glasses, a wearable camera, a smart watch, a wristband, smart earwear, gloves, a necktie, a smart carrying bag, a smart backpack, a smart clothing or smart shoes. The second personal device may be a wearable activity tracking monitor. At least some data used by the first personal device may be provided via the Internet. At least one of the personal devices may use GPS functionality. The first personal device may communicate with the second personal device using a wireless network. The second personal device may be used to authenticate the user to allow operation by the first personal device. The second personal device may authenticate the user with biometrics. An event at a particular one of the personal devices may cause the particular one of the personal devices to activate another one of the personal devices. Activation of the other one of the personal devices may require additional input by the user. Data collected on the second personal device may be visually presented to the user on the first personal device. Each of the first and second portions of the distributed application may be defined according to an application identifier, a specific one of the personal devices on which each of the portions runs, an event that causes each of the portions to run, at least one other of the personal devices that interacts with the specific one of the personal devices, and a task initiated on the at least one other of the personal devices. One of the personal devices may activate at least one other device that is separate from the user. The at least one other device may be a garage door opener, a house door opener, and/or a climate control device.

The proposed system includes a set of custom user interfaces and workflows for configuration, authentication, activation, information display, interaction with the outside environment and other aspects of functioning of a software application or a collection of interoperating software applications running on multiple mobile devices simultaneously used by an individual and potentially interacting with adjacent personal and other networks.

In addition to smartphones and tablets, users may use a variety of smart mobile devices, including wearable accessories such as smart glasses, wearable cameras or other augmented reality devices, smart watches, activity tracking monitors such as wristbands, smart earwear, gloves, neckties, smart carrying accessories such as bags and backpacks, smart clothing, for example, jackets and shoes, etc. The smart mobile devices may include a broad range of sensors for measuring physiological characteristics of owners and environmental parameters in the proximity of owners. Devices may also include location detection technologies, displays of different sizes and resolutions, which may be added for pure viewing capabilities or may be supplied with active user interface tools, such as multi-touch screens or eye tracking technologies. Devices may be wirelessly connected via short-range RF technologies such as Bluetooth and capable of synchronizing with smartphones and other wearable devices. Together, the smart mobile devices create a personal mobile environment, which, in terms of access to various devices, resembles a Body Area Network or a Private Area Network (BAN and PAN), and may interoperate with analogous mobile environments of other individuals and with other networks, for example, a car network (CAN bus) or a home area network (HAN).

A difference between traditional architecture and workflow for multi-platform cloud-desktop-mobile applications and applications for personal mobile environments is that the traditional applications may have certain feature parity between platforms, consistent graphical user interfaces, and sets of control tools; in contrast, applications in a new personal mobile environment may deal with substantially different types of devices, for which many of the features from the complete feature set may not exist (for example, displaying emails or driving directions on an activity tracking wristband with a basic LED indicator). Additionally, time span in application usage may significantly differ between devices; in many cases, as display and control capabilities of a mobile device become more limited, the user sessions of interactions with the device becomes shorter. For example, a glance and possibly a tap or another control gesture on a smart watch may take just a few seconds, compared with a minute of viewing and possibly basic editing of information on a smartphone compared still with a much longer period of advanced capturing and processing of new information on full-size tablets and PCs. At the same time, interaction between various devices in a personal mobile environment may play a much bigger role due to distribution of functions between devices.

Therefore, the new generation of multi-platform applications may have substantially different feature sets and user interfaces for various devices and may employ different interaction metaphors (compared with a traditional case) where active devices may invoke different instances of the same application or launch additional applications on other devices via wireless or other connections, subject to tasks and events occurring within a personal mobile environment or in adjacent networks.

Distributed user interface and interaction may be illustrated by the following examples:

1. One example is personal identification using smart glasses and smartphone. A user of a personal mobile environment, which includes both smart glasses (such as Google Glass) and a smartphone, may meet a person at a business meeting, a conference or a party and wants to quickly identify the person. A list of meeting, conference or party participants with corresponding photos and contact information may be pre-loaded to the cloud prior to the event. The user may then utilize a distributed application on the smart glasses, which performs the following steps:
   a. The application takes a photo of the person using a camera of user's smart glasses.
   b. The application invokes a smartphone bound instance of the application and transfers the photo to user's smartphone.
   c. The smartphone version of the application logs in into the associated cloud service and performs face recognition and identification of the received photograph against a list of participants to choose the best match (es).
   d. Then the application on the smartphone retrieves from the cloud service contact information for the best match(es) and displays the contact information on the screen together with the original photos.
   e. The user may choose to save the final match into a preferred contact application.
2. Another example is biometric authentication for unlocking application features, devices and networks.
   (i) One of a plurality of wearable devices in a personal mobile environment of the user possess a biometric authentication capability, such as a fingerprint reader, a retina or an iris scanner, a wristband based heartbeat monitor with authentication capability, a voice authentication device or other authentication technology or mechanism.
   (ii) Another device, for example, a built-in car navigator, may have a location detection capability, such as GPS.
   (iii) A third device may be a smartphone (possibly with a voice recognition capability).
   All devices may be running different instances of a distributed application. The different instances of the distributed application may interact with each other and with a home network of a user, in particular, with a climate control device and a garage door opener. A software application may work as follows:
   a. Once a direction toward the home of the user and a sufficient proximity from the home has been detected by the car navigator, the navigator activates the application instance on the smartphone, which calculates an estimated travel time based on traffic conditions provided by the car navigation system.
   b. As soon as the estimated travel time crosses a time threshold to start preparing the home for arrival of the user, the smartphone sends a request to a biometric authentication device, such as a wristband with a heartbeat sensor that acts as an authentication mechanism and includes a Bluetooth connection.
   c. If the authentication result is positive, so that the smartphone user (the car driver) has been identified as the valid owner, the authentication device unlocks the communication capability of the smartphone application with the home network of the user.
   d. The smartphone logs into the home network and checks whether there is anybody at home. If there is nobody at home, the smartphone directs the home network to activate climate control (HVAC). Later on, when the user arrives to the garage door, the phone re-activates the car system, which turns on a garage door opener.

In some embodiments, the system may request a user authorization after the user is authenticated but prior to performing the actions. For such enhanced security, the system may generate, for example, an audio request to the user replayed by a smartphone at the step 2c, above. Upon a voice confirmation by the user, which is recognized by the smartphone, the subsequent actions may be performed.
3. Another example is displaying detailed information in response to a system event. For instance, a wristband or other type of activity monitor may provide a distributed user interface and may track user movement in combination with a smartphone. Once the activity monitor detects an insufficient level of muscular activity, the activity monitor may provide normal user feedback as a characteristic sound signal and/or a blinking LED indicator to attract user attention and motivate changing the routine. With the distributed user interface, a combination of the wristband with a smartphone, smart glasses or other device with a sufficient displaying capability may be configured to offer more extensive feedback to the user:
   a. The wristband may activate the smartphone (or other device with a robust displaying capability) and transfer to the smartphone a portion of the user activity data that caused the wristband to generate the system event corresponding to insufficient muscular activity and to notify the user about the event.
   b. The smartphone may format the data, analyze the data, generate specific recommendation and display the data as a table, graph, text or other detailed feedback with specific recommendations on necessary additional activity level.

Similarly, an event or an email notification arriving at a smart watch and instantly viewed by a user may cause a smart watch based component of a distributed software application to instantly activate another device available in a personal mobile environment (smartphone, smart glasses, tablet, etc.) to display and allow processing of the detailed information about the event, such as a response to an email. Such activation of an application on other device(s) may be done either automatically based on an event corresponding to the user viewing the email (evidenced by, for example, the user scrolling back and forth, eye tracking the user, time spent with the document on the screen, etc.) or may require a user control action such as clicking on an icon or performing a multi-touch gesture or a spatial gesture on an initial device (smart watch) that receives the event.

Multiple display devices may also be configured and prioritized so that, for example, a default display device for a distributed application may be a tablet and a secondary device is a smartphone, and if both devices are inaccessible in the personal mobile environment at the time a notification is received by a smart watch, then smart glasses of the user, for example, may be used as a backup alternative.

The proposed system includes a number of aspects of distributed user interfaces and workflow, illustrated by the above sample applications:
   Design of application feature set on each device;
   Configuring a personal mobile environment;
   Support for runtime connectivity and device discovery;
   Authentication within a personal mobile environment and with adjacent external networks;
   Device and application activation in response to tasks, routines or events; and
   Customized information display and control for multi-platform applications and application suites simultaneously running on several devices within a personal mobile environment and optionally interacting with adjacent networks.

BRIEF DESCRIPTION OF THE DRAWINGS

Embodiments of the system described herein will now be explained in more detail in accordance with the figures of the drawings, which are briefly described as follows.

DETAILED DESCRIPTION OF VARIOUS EMBODIMENTS

The system described herein provides a mechanism for design and configuration of feature sets, user interfaces, interactions and workflows for distributed software applications that are simultaneously available on multiple mobile devices with different hardware capabilities, functionality and form factors and fulfill different tasks in a personal mobile environment of a user. Additionally, the system described herein provides a mechanism for designing interactions of personal mobile environments with adjacent personal, enterprise or public networks.

Figure 1:
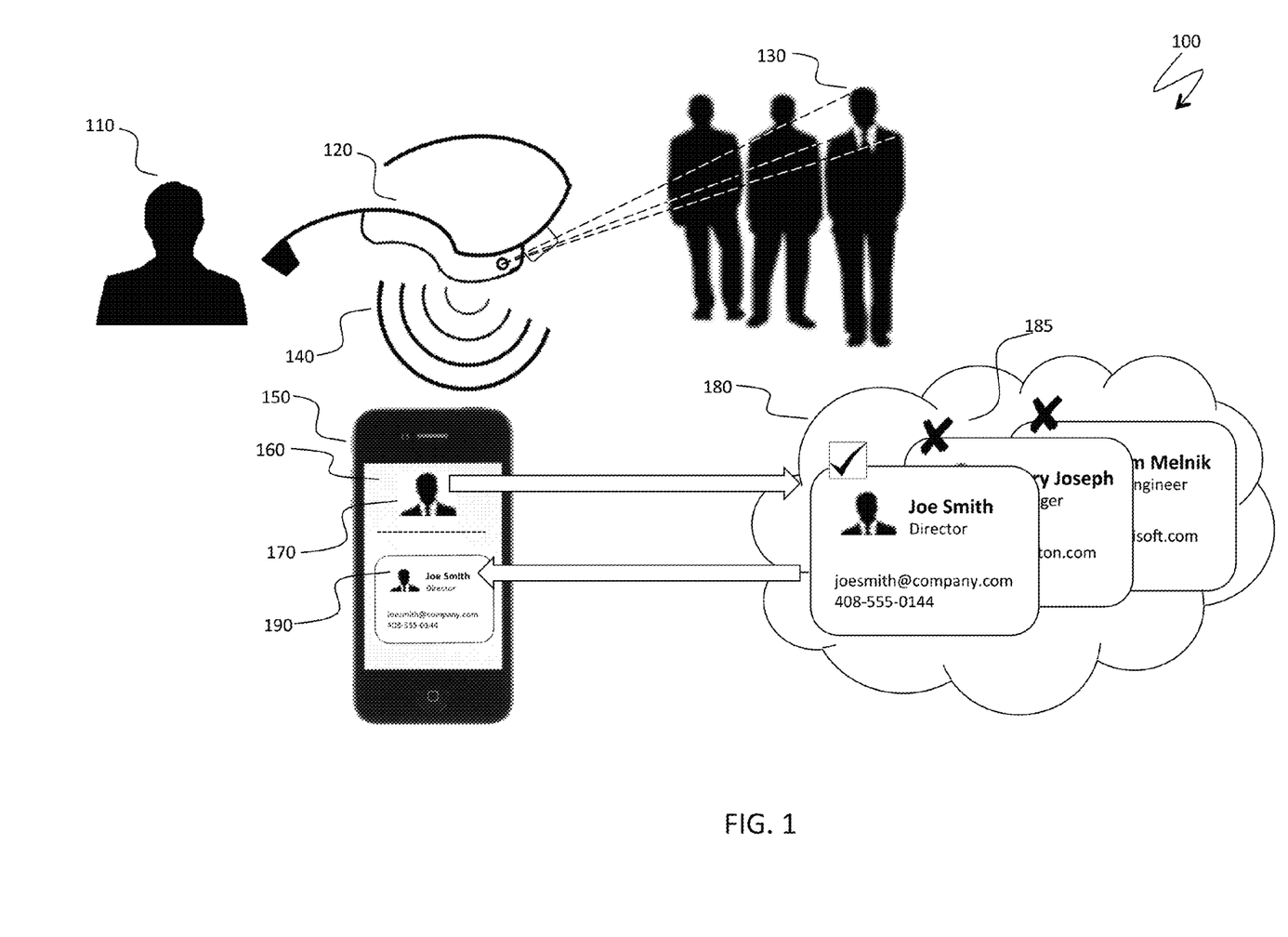
FIG. 1 is a schematic illustration of a distributed user interface for an application identifying people by facial photos, according to an embodiment of the system described herein.

FIG. 1 is a schematic illustration 100 of a distributed user interface for an application identifying people by facial photos. A user 110 enters a meeting wearing smart glasses 120. A camera of the smart glasses 120 uses a distributed application to take a photograph of a meeting participant 130 that the user may not have met in the past and who may not have been introduced to the user. A component of the distributed application on the smart glasses 120 uses a wireless connection 140 (such as a Bluetooth or a Wi-Fi connection) to activate an instance of the distributed application on a smartphone 150 of the user and to transfer the photograph to the smartphone 150. An instance of the distributed application 160 on the smartphone 150 transfers a received photograph 170 to a cloud service 180 where contact information 185 of meeting participants is stored. The cloud service 180 performs facial recognition of the photograph 170, matches the photograph 170 against photos of other meeting participants, identifies the best match(es) and sends corresponding contact information 190 back to the smartphone 150, so that the user may greet the meeting participant 130.

Figure 2:
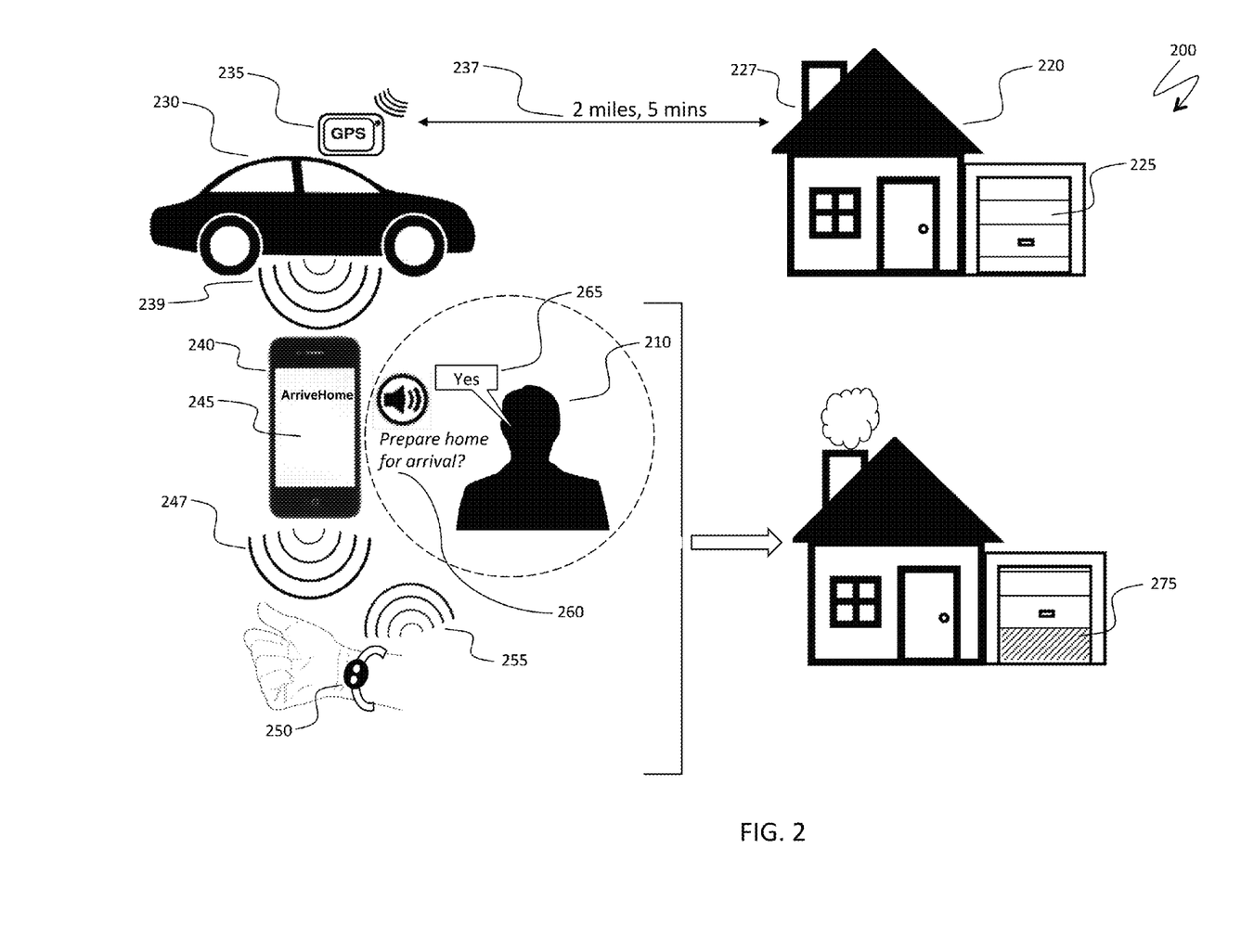
FIG. 2 schematically illustrates a distributed user interface for an application that prepares home appliances in response to arrival of a user, according to an embodiment of the system described herein.

FIG. 2 is a schematic illustration of a distributed user interface for an application that prepares home appliances in response to arrival of a user 210. The user 210 approaches his home 220 that has a garage 225 and an HVAC system 227. The user 210 travels in a car 230 that is supplied with a GPS-enabled car navigation system 235 which is running an instance of a distributed mobile application capable of estimating a driving distance to the home 220 and calculating a time interval to arrival based on traffic conditions, as illustrated by an item 237. When the time to arrival is less than a pre-defined threshold (say, five minutes), the car-based component of the application communicates, through a wireless connection 239 (for example, a Bluetooth connection) with a smartphone 240 of the user and activates a smartphone-based instance 245 of the distributed mobile application. In order to operate, the smartphone-based instance 245 authenticates the user 210 to protect the home 220 from potential intrusion by a car thief (or anyone else that is not the user 210). Accordingly, the instance 245 may activate, through a wireless connection 247, another instance of the application on a wearable device 250, such as a wristband with a pulse sensor and a heartbeat based authentication software. In the event that authentication succeeds, the smartphone instance 245 proceeds with the task. (Note that the wristband based instance of the distributed application may communicate with the smartphone instance both during the authentication process and at the end of the process, as schematically shown by the wireless connection 247 and a different wireless connection 255.)

Following a successful authentication, the wristband bound instance of the distributed mobile application generates a confirmation that is transmitted to the smartphone based instance 245, which generates an authorization request 260 delivered to the user 210 as a voice message. The user 210 may respond with a Yes or No to the request, as illustrated by a reply 265; a voice response of the user 210 is captured and recognized by the smartphone instance 245 of the software. If the request is confirmed, the smartphone instance 245 of the distributed application may interact with the home network to check if anyone is at home and whether the HVAC is on, and may instruct the home network to turn on the HVAC if needed. Upon arrival to the home 220, the distributed mobile application on the smartphone may also communicate back to the car component of the distributed mobile application an instruction to activate a garage door opener 275.

Figure 3:
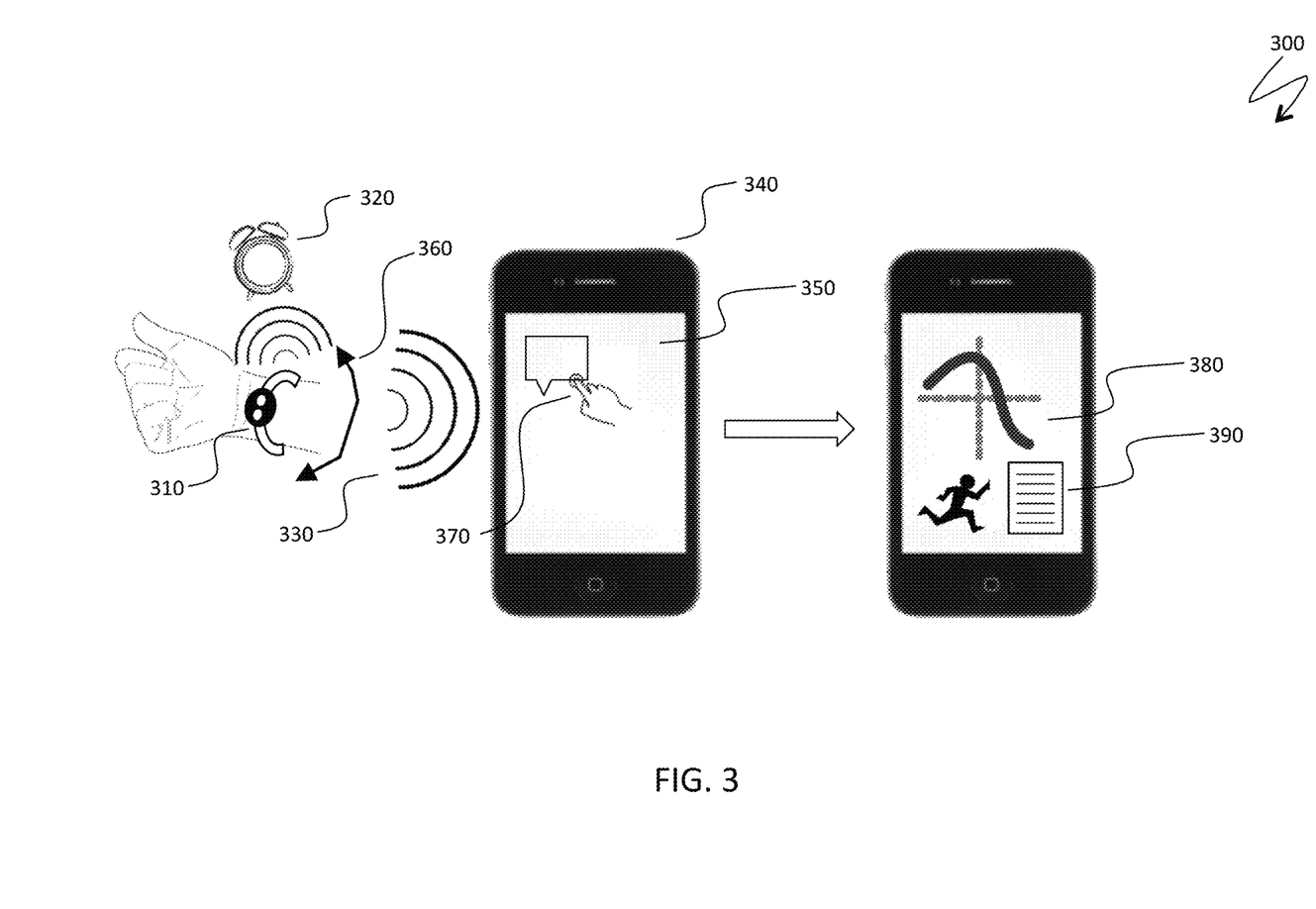
FIG. 3 is a schematic illustration of a distributed user interface for an application that monitors user activity on a smart wristband and a smartphone, according to an embodiment of the system described herein.

FIG. 3 is a schematic illustration 300 of functionality and a user interface for a distributed software application that monitors user activity on a smart wristband 310 and a smartphone 340. The smart wristband 310 with motion tracking sensors and possibly other body sensors tracks muscular activity of a user and may store corresponding data. A wristband bound instance of the distributed software application may detect periods of reduced muscular activity and inform the user, as many motion tracking applications, about the motion deficit, for example, via a sound alarm 320. The user might want to obtain more details on any activity analysis and recommendations, which may not be provided by the wristband (or even a smart watch with an integrated wristband) due to basic display capabilities of the wristband and/or smart watch. To this end, the distributed software application may provide another instance on a smartphone of the user or possibly other device(s) of the user with larger screens. Upon reaching a warning event 320, the wristband instance of the distributed software application may communicate status and may transfer corresponding stored motion data via a wireless connection 330, such as a Bluetooth connection, to the smartphone 340 of the user and may activate a smartphone based instance 350. Such activation may be initiated by the user directly on the wristband; for example, if the wristband is capable of processing spatial gestures, an arm rotating gesture 360 may instruct the wristband instance of the software to initiate the process. Alternatively, data transfer and notification on the smartphone 340 may occur automatically in response to the warning event 320, but the user may receive a notification and have to activate the application instance on the smartphone 340, as illustrated by an item 370. In response to activation of the smartphone based instance 350, the software processes motion data transmitted from the wristband, builds necessary graphs 380 and creates textual reports and recommendations 390, and displays the graphs 380 and the reports and recommendations 390 to the user on the screen of the smartphone 340.

Figure 4:
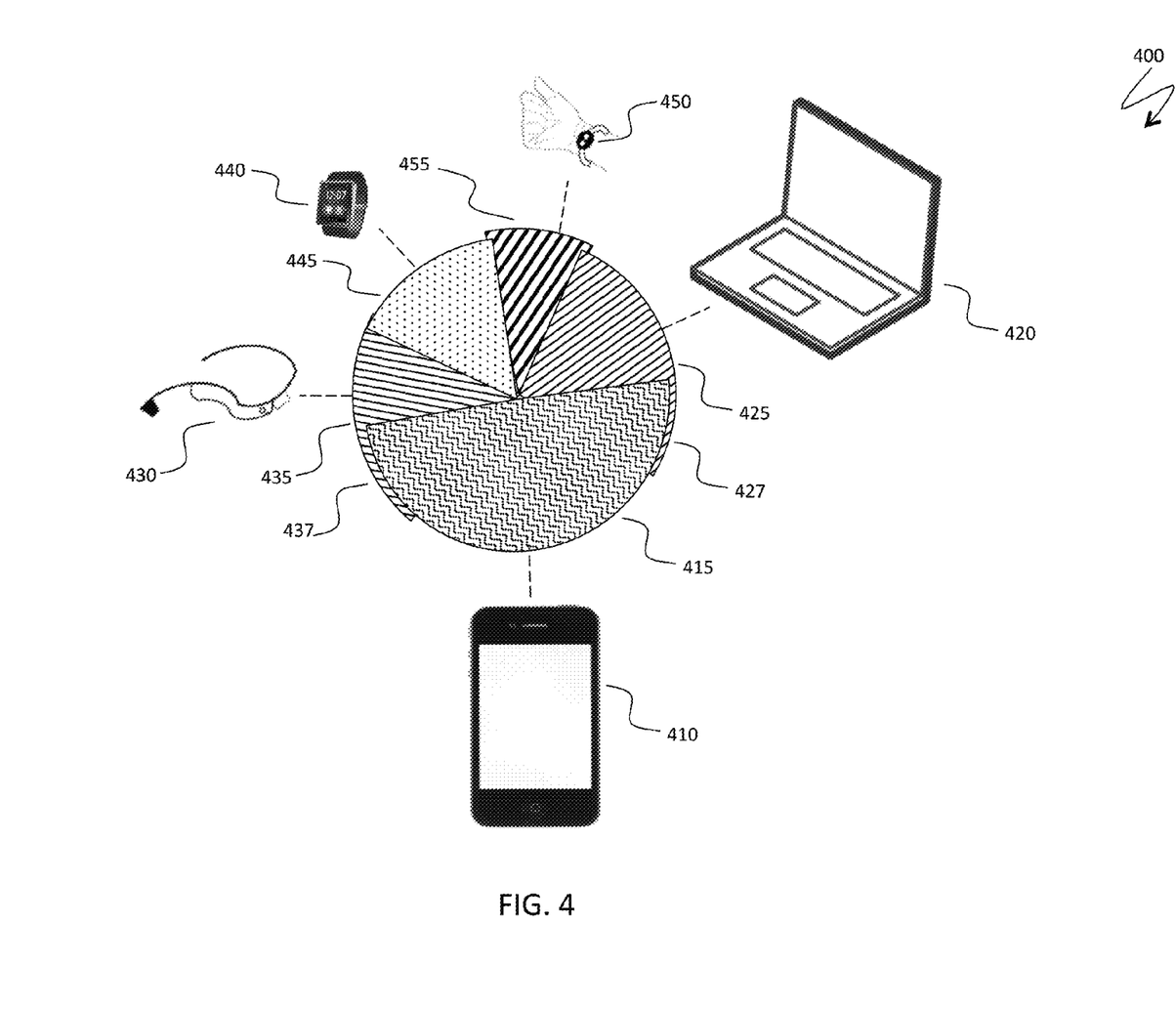
FIG. 4 is a schematic illustration of feature partitioning between mobile devices for a distributed software application, according to an embodiment of the system described herein.

FIG. 4 is a schematic illustration 400 of feature partitioning between mobile devices for a distributed software application. In some instances, a smartphone 410 is a central component of a personal mobile environment. The smartphone 410 has a largest share of features 415 in a distributed software application. In cases where the distributed application has an instance running on desktop and notebook computers 420, a feature footprint 425 corresponding to the computers 420 may also be significant, due to extensive viewing, data input and communication capabilities of the computers 420. An overlapping area 427 of smartphone and desktop/notebook feature sets may include viewing features, limited keyboard data entry (advanced keyboard entry may remain an exclusive desktop feature), certain data capturing capabilities, such as web or document clipping, wireless data transfer, etc.

A wearable augmented reality device, such as smart glasses 430, may also possess a significant share of features 435 in a distributed application due to extensive data visualization, touch control, connectivity and voice recognition and replay capabilities of the smart glasses 430. An intersection 437 of the feature sets with a smartphone, schematically illustrated in FIG. 4, may also include display and communication features, as well as voice and audio features, including data entry and device control via voice recognition. Other wearable devices with smaller form factors and feature sets may include smart watches 440 with a feature set 445 and wristbands 450 with a feature set 455, which may be overlapping with each other and with feature sets of other devices by such features as wireless connectivity and audio generation and may also possess unique features, such as a biometric authentication capability of a wristband, explained in conjunction with FIG. 2.

Figure 5:
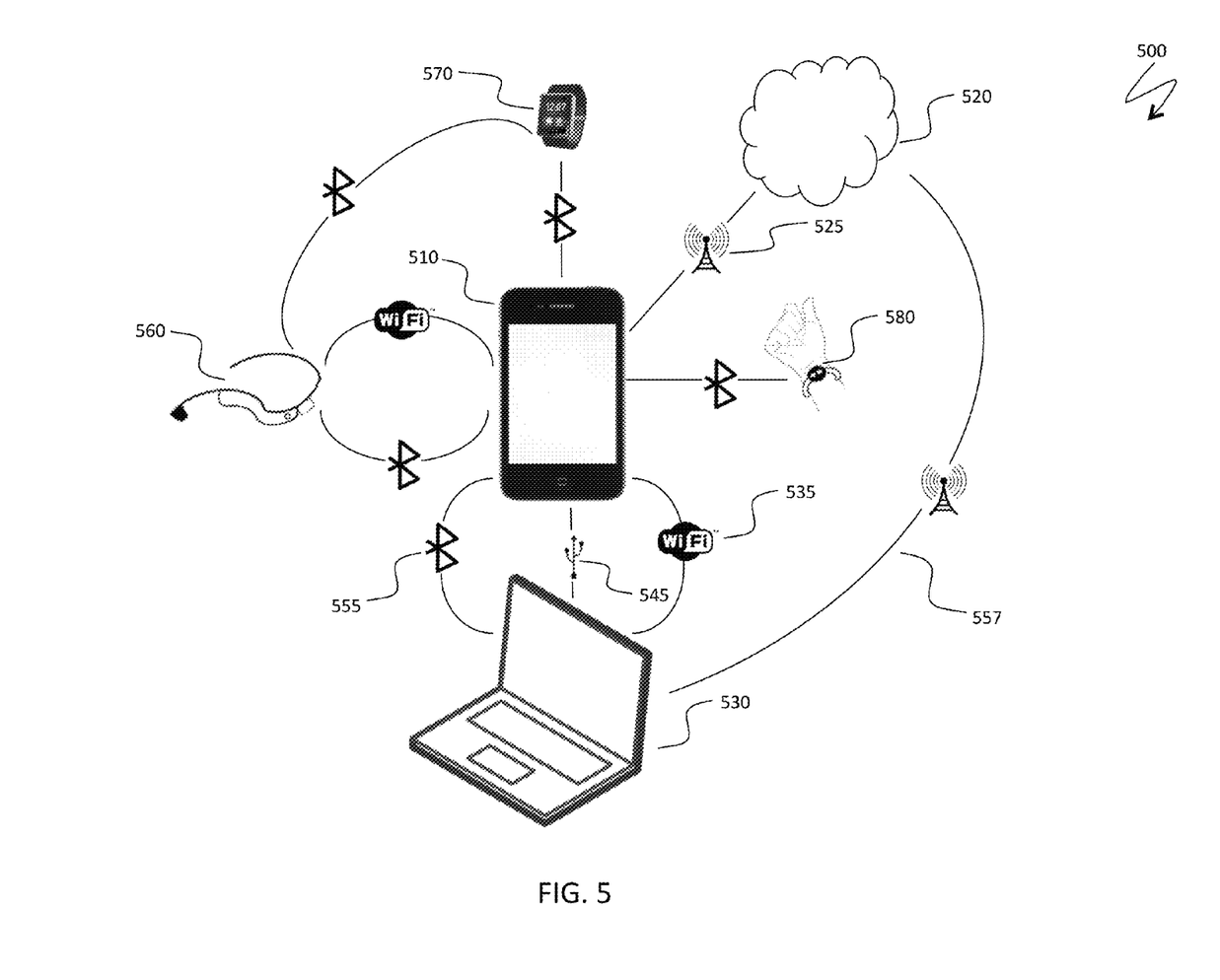
FIG. 5 is a schematic illustration of a device connectivity graph using different connectivity technologies, according to an embodiment of the system described herein.

FIG. 5 is a schematic illustration 500 of a device connectivity graph using different connectivity technologies. Device connectivity facilitates distributed software applications in personal mobile environments: device connectivity enables activation of various instances of a distributed application on different devices, transfer of data and functioning instructions, etc. A mobility requirement assumes, for the most part, that any devices in a personal mobile network can interact and exchange data, directly or through other devices, via a wireless connection. FIG. 5 provides only an example of wireless connectivity chart utilizing some technologies; connectivity options such as NFC constantly evolve and advanced technologies become affordable on a broadening set of mobile devices.

As explained elsewhere herein, a smartphone 510 may have a significant number of features in a personal mobile environment; therefore, the smartphone 510 is placed in the middle of the illustration 500, given that data exchange and function control between many devices in the personal mobile environment is facilitated by the smartphone 510. In some instances, the smartphone 510 may be the only component of the personal mobile network with nearly permanent connection with cloud services and applications 520 via a cellular network 525 or other WAN (Wide Area Network) connection(s). Additionally, many smartphones may serve as Wi-Fi hotspots and provide Internet connectivity to other Wi-Fi devices, such as notebooks or certain models of augmented reality devices. A notebook 530 has many diverse connectivity options with the smartphone 510, which may include Wi-Fi connectivity 535 (which depends on the presence of a Wi-Fi hotspot in the proximity of both the notebook 530 and the smartphone 510; USB connectivity 545, which is the only wired connection shown in the illustration 500 and may be used sporadically, for example, for fast transmission of large data volumes; Bluetooth connectivity 555, etc. Additionally, a notebook or a desktop computer may be directly connected to the internet via a WAN modem connection 557. For other devices, connectivity options may include Bluetooth Wi-Fi connectivity between smart glasses 560 and the smartphone 510; Bluetooth connectivity between smart watches 570 and both the smartphone 510 and the smart glasses 560, and Bluetooth connectivity between a smart wristband 580 and the smartphone 510. Direct connections between the wristband 580 and the smart glasses 560 and/or smart watches 570 is also possible (not shown in FIG. 5).

Figure 6:
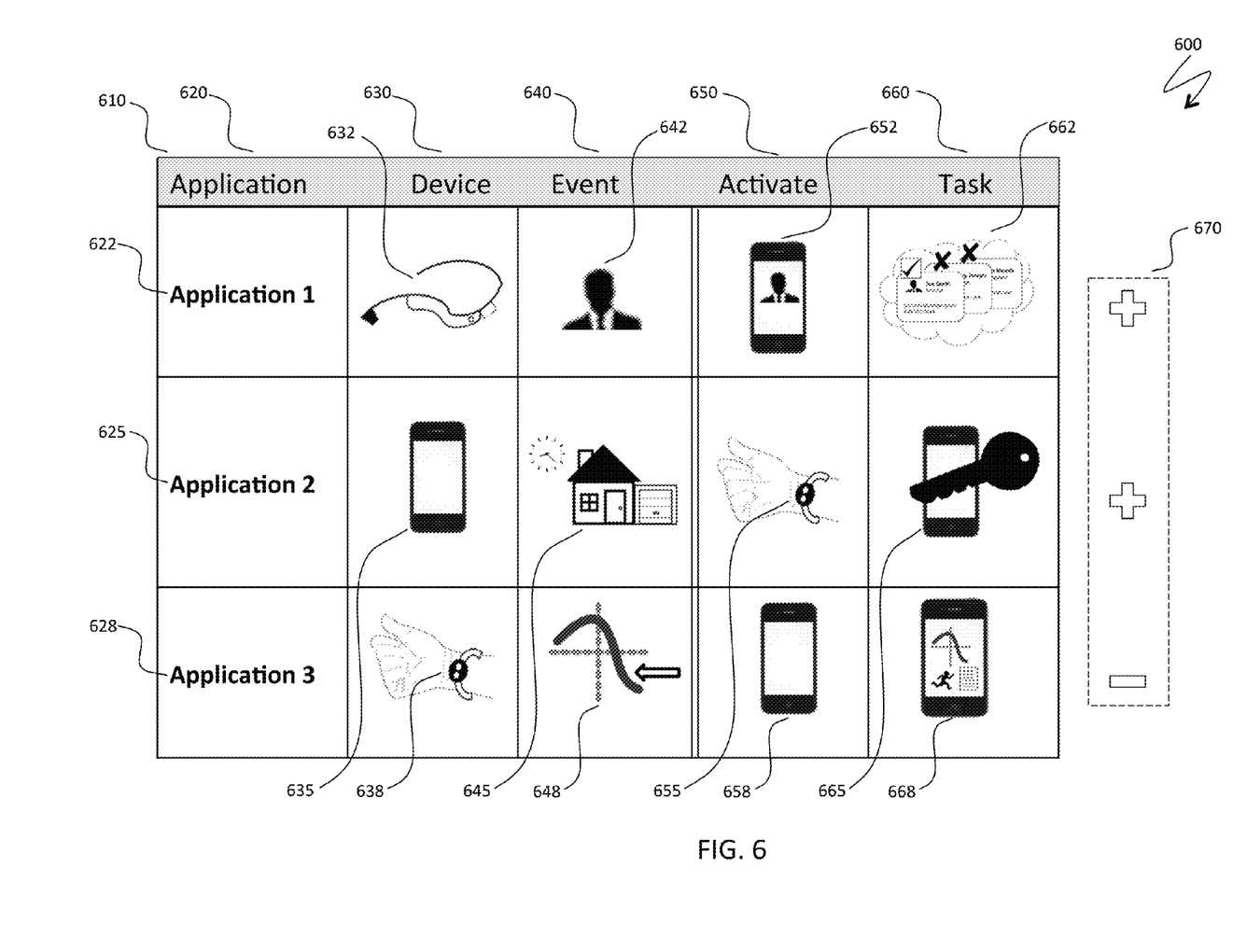
FIG. 6 is a schematic illustration of configuring device activations and tasks performed by device instances of a distributed application in response to events occurring in a personal mobile environment, according to an embodiment of the system described herein.

FIG. 6 is a schematic illustration 600 of configuring device activations and tasks performed by device instances of a distributed application in response to events occurring in a personal mobile environment. A distributed mobile application design matrix (or database) 610 is a collection of interaction records: each record represents an interaction between various instances of a distributed application running on different devices. An interaction record may include the following fields:

An application field 620 that contains an application name and possibly a corresponding unique ID(s) in the system and other general parameters for each record;

A source device field 630 that identifies a mobile device where an application instance is running and a certain system event is occurring causing an interaction with another device in a personal mobile environment or with another network;

An event field 640 that contains a system event that initiates an interaction by the source device;

An activation field 650 that identifies a destination device that must be activated or otherwise interact with the source device; and A task (action) field 660 that indicates a task or routine initiated on the destination device.

All possible interactions between mobile devices for a distributed mobile application in response to system events, as well as all associated actions, may be represented by distinct records in the collection 610 at the design phase. The collection 610 may have redundancies and alternative ways of accomplishing application functioning; a system designer may select certain records and exclude other records to build the application behavior in response to various events, as exemplified by plus and minus signs in a section 670.

In FIG. 6, three interaction records are illustrated, one record per each of the applications explained in FIGS. 1, 2, 3:

1. A sample interaction record for the distributed application 622, illustrated in connection with FIG. 1, (explained in more details elsewhere herein), deals with the interaction of a smart glasses bound component 632, initiated by an event 642 of taking a photograph, which activates a smartphone bound instance 652 with a task 662 of preparation for retrieval of the contact info from the associated cloud service, which requires, in its turn, activation of the cloud component and sending the photograph associated with the event 642 to the associated cloud service (a subsequent interaction record between the smartphone and the cloud service is not shown in FIG. 6).
2. An interaction record for the distributed application 625, illustrated in connection with FIG. 2 and the accompanying text, deals with an interaction initiated by a smartphone bound instance 635 immediately after the smartphone bound instance 635 has received an indication from the car navigation system that the car is close enough to a home of a user; a corresponding event 645 is the moment when an estimated period for arrival crosses a predefined threshold, as explained in FIG. 2 and illustrated by a clock in a depiction of the event 645. Accordingly, the smartphone bound instance 635 interacts with a smart wristband bound instance 655 and sends a request to perform a corresponding task 665 of a biometric user authentication.
3. An interaction record for the distributed application 628, illustrated in connection with FIG. 3, describes an interaction initiated by a smart wristband bound instance 638 when an event 648 of low muscular activity of the user has been identified and causes an alarm. In response, the application bound instance 638 activates a smartphone bound instance 658 to perform a task of displaying a user motion activity graph and text report 668. Note that, unlike the interaction records described in connection with 1 and 2, above, the record is disabled by a software designer in a section 670; while disabling the interaction record is presented for illustration purposes, a reason for such disabling could be that a mandatory display of the graph and reports every time an alarm event has been generated is considered undesirable and the software designer might have chosen another interaction record where the display occurs only after an explicit user instruction, such as a spatial gesture to invoke the reporting, as explained elsewhere herein.

It should be noted that some interaction records for a distributed mobile application may be mandatory. For example, if an authentication task is included in the task list for the mobile distributed application illustrated in connection with FIG. 2, above, and if it is known that the authentication is performed by a smart wristband, then an interaction of the smartphone bound instance of the application with the wristband bound instance represents an example of such mandatory interaction. Accordingly, interaction records available for software designer choices may correspond to a subset of all such records.

Figure 7:
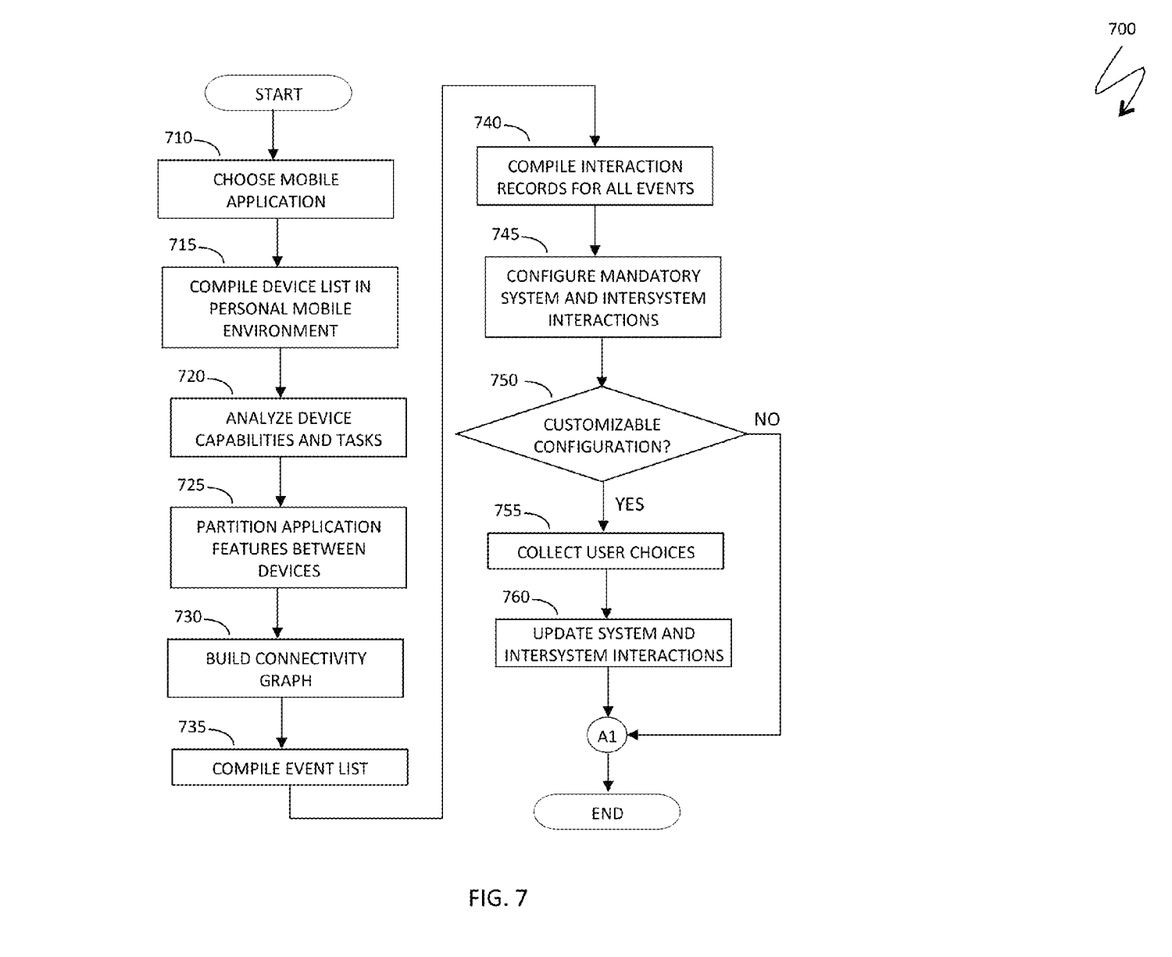
FIG. 7 is a system flow diagram describing functioning in connection with a system design phase, according to an embodiment of the system described herein.

Referring to FIG. 7, a flow diagram 700 illustrates processing performed in connection with functioning of a design phase of the system described herein. Processing begins at a step 710 where a mobile application is chosen and analyzed. After the step 710, processing proceeds to a step 715 where a list of mobile devices that the application is running is compiled. After the step 715, processing proceeds to a step 720 where device capabilities and tasks are analyzed. After the step 720, processing proceeds to a step 725 where application features, such as information display, data entry, authentication, notifications, interaction with other networks and systems, etc. are assigned to various devices, according to capabilities of the other networks and systems, as explained in conjunction with FIG. 4.

After the step 725, processing proceeds to a step 730 where a connectivity graph between devices for the distributed application is built, as explained in conjunction with FIG. 5. After the step 730, processing proceeds to a step 735 where an event list for the application functioning is compiled, as illustrated elsewhere herein; see examples in column 640 in FIG. 6. After the step 735, processing proceeds to a step 740 where interaction records for all events are built. After the step 740, processing proceeds to a step 745 where a mandatory collection of interaction records for intra and intersystem interactions is compiled. After the step 745, processing proceeds to a test step 750 where it is determined whether a customizable configuration of the distributed application is required. If not, processing is complete; otherwise, processing proceeds to a step 755 where choices of a user (for example, a software designer) are collected, as explained in conjunction with FIG. 6. After the step 755, processing proceeds to a step 760 where system and intersystem interactions are updated according to user choices. After the step 760, processing is complete.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, elements and areas of screen described in screen layouts may vary from the illustrations presented herein. Further, various aspects of the system described herein may be implemented using software, hardware, a combination of software and hardware and/or other computer-implemented modules or devices having the described features and performing the described functions. The mobile device may be a cell phone, a tablet, a wearable device such as a smart watch, smart glasses, a smart wristband, smart clothing or other type or wearable device; other devices, such as a laptop or desktop computer, are also possible. The mobile device may include software that is pre-loaded with the device, installed from an app store, installed from a desktop (after possibly being pre-loaded thereon), installed from media such as a CD, DVD, etc., and/or downloaded from a Web site. The mobile device may use an operating system selected from the group consisting of: iOS, Android OS, Windows Phone OS, Blackberry OS and mobile versions of Linux OS. Mobile and other devices may be connected by various types of wireless and other connections, such as cellular connections in Wide Area Networks, Wi-Fi, Bluetooth, NFC, USB, infrared, ultrasound and other types of connections.

Software implementations of the system described herein may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor.

The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of providing a distributed application on a plurality of personal devices of a user, comprising:
   providing a first portion of the distributed application on a first personal device;
   providing a second portion of the application on a second personal device different from the first personal device, wherein the second personal device is wearable by the user;
   receiving, at the second personal device, a request to authenticate the user;
   in response to the request to authenticate the user of the first personal device, acquiring, at the second personal device, biometrics of the user;
   authenticating the user based on the acquired biometrics;
   receiving, at the first personal device, confirmation of the authentication of the user; and
   in accordance with the confirmation of the authentication of the user, enabling the user to operate the first personal device;
   wherein each of the first and second portions of the distributed application is defined according to:
   an application identifier,
   a specific one of the personal devices on which each of the portions runs,
   an event that causes each of the portions to run,
   at least one other of the personal devices that interacts with the specific one of the personal devices, and
   a task initiated on the at least one other of the personal devices.

2. A method, according to claim 1, wherein the first personal device is one of: a mobile phone, a tablet, and a personal computer.

3. A method, according to claim 1, wherein the second personal device is one of: smart glasses, a wearable camera, a smart watch, a wristband, smart earwear, gloves, a necktie, a smart carrying bag, a smart backpack, smart clothing and smart shoes.

4. A method, according to claim 3, wherein the second personal device is a wearable activity tracking monitor.

5. A method, according to claim 1, wherein at least some data used by the first personal device is provided via the Internet.

6. A method, according to claim 1, wherein at least one of the personal devices uses GPS functionality.

7. A method, according to claim 1, wherein the first personal device and the second personal device communicate using a wireless network.

8. A method, according to claim 1, wherein an event at a particular one of the personal devices causes the particular one of the personal devices to activate another one of the personal devices.

9. A method, according to claim 8, wherein activation of the other one of the personal devices requires additional input by the user.

10. A method, according to claim 1, wherein data collected on the second personal device is visually presented to the user on the first personal device.

11. A method, according to claim 1, wherein one of the personal devices activates at least one other device that is separate from the user.

12. A method, according to claim 11, wherein the at least one other device is one of: a garage door opener, a house door opener, and a climate control device.

13. A method, according to claim 1, wherein authenticating the user based on the acquired biometrics comprises authenticating the user at a server system.

14. A method, according to claim 1, wherein authenticating the user based on the acquired biometrics comprises authenticating the user at the second personal device.

15. A method, according to claim 1, wherein the request to authenticate the user is received from the first personal device.

16. A non-transitory computer-readable medium containing a distributed application with software runnable on a plurality of personal devices of a user, the software comprising:
    executable code corresponding to a first portion of the distributed application that runs on a first personal device;
    executable code corresponding to a second portion of the application that runs on a second personal device different from the first personal device, wherein the second personal device is wearable by the user;
    instructions, which when executed by the second personal device, cause the second personal device to:
    receive a request to authenticate the user; and
    in response to the request to authenticate the user of the first personal device, acquire biometrics of the user;
    instructions to authenticate the user based on the acquired biometrics;
    instructions, which when executed by the first personal device, cause the first personal device to:
    obtain confirmation of the authentication of the user; and
    in accordance with the confirmation of the authentication of the user, enable the user to access one or more restricted features at the first personal device;
    wherein each of the first and second portions of the distributed application is defined according to:
    an application identifier,
    a specific one of the personal devices on which each of the portions runs,
    an event that causes each of the portions to run,
    at least one other of the personal devices that interacts with the specific one of the personal devices, and
    a task initiated on the at least one other of the personal devices.

17. A non-transitory computer-readable medium, according to claim 16, wherein the first personal device is one of: a mobile phone, a tablet, and a personal computer.

18. A non-transitory computer-readable medium, according to claim 16, wherein the second personal device is one of: smart glasses, a wearable camera, a smart watch, a wristband, smart earwear, gloves, a necktie, a smart carrying bag, a smart backpack, smart clothing and smart shoes.

19. A non-transitory computer-readable medium, according to claim 18, wherein the second personal device is a wearable activity tracking monitor.

20. A non-transitory computer-readable medium, according to claim 16, wherein at least some data used by the first personal device is provided via the Internet.

21. A non-transitory computer-readable medium, according to claim 16, wherein at least one of the personal devices uses GPS functionality.

22. A non-transitory computer-readable medium, according to claim 16, wherein the first personal device and the second personal device communicate using a wireless network.

23. A non-transitory computer-readable medium, according to claim 16, wherein an event at a particular one of the personal devices causes the particular one of the personal devices to activate another one of the personal devices.

24. A non-transitory computer-readable medium, according to claim 23, wherein activation of the other one of the personal devices requires additional input by the user.

25. A non-transitory computer-readable medium, according to claim 16, wherein data collected on the second personal device is visually presented to the user on the first personal device.

26. A non-transitory computer-readable medium, according to claim 16, wherein one of the personal devices activates at least one other device that is separate from the user.

27. A non-transitory computer-readable medium, according to claim 26, wherein the at least one other device is one of: a garage door opener, a house door opener, and a climate control device.

* * * * *